(12) United States Patent
Huang (10) Patent No.: US 8,040,336 B2
(45) Date of Patent: *Oct. 18, 2011

(54) RESCUE CIRCUIT LINE, DISPLAY DEVICE HAVING THE SAME AND METHOD FOR MANUFACTURING THE SAME

(75) Inventor: Hsueh-Ying Huang, Taipei Hsien (TW)

(73) Assignee: Au Optronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/838,262

(22) Filed: Jul. 16, 2010

(65) Prior Publication Data

US 2010/0277445 A1  Nov. 4, 2010

Related U.S. Application Data

(63) Continuation of application No. 11/517,347, filed on Sep. 8, 2006, now Pat. No. 7,782,286.

(30) Foreign Application Priority Data

Sep. 9, 2005 (TW) ................................ 94131221 A (51) Int. Cl.
*G09G 5/00* (2006.01)
(52) U.S. Cl. .............. 345/204; 345/93; 349/54; 349/55; 349/139; 327/526
(58) Field of Classification Search .................... 345/93, 345/204; 349/54, 55, 139; 365/200; 327/526
See application file for complete search history.

(56) References Cited

U.S. PATENT DOCUMENTS

| | | | |
|---|---|---|---|
| 4,807,973 A | 2/1989 | Kawasaki | |
| 5,475,246 A | 12/1995 | Wei et al. | |
| 5,608,245 A | 3/1997 | Martin | |
| 5,859,679 A | 1/1999 | Song | |
| 6,111,558 A * | 8/2000 | Jeung et al. | 345/93 |
| 7,782,286 B2 * | 8/2010 | Huang | 345/93 |
| 2001/0026332 A1 * | 10/2001 | Kida | 349/43 |
| 2003/0025846 A1 | 2/2003 | Murakami et al. | |
| 2003/0077973 A1 | 4/2003 | Wu | |
| 2004/0169781 A1 | 9/2004 | Lee et al. | |
| 2005/0128373 A1 * | 6/2005 | Hong et al. | 349/55 |
| 2007/0045625 A1 * | 3/2007 | Chen et al. | 257/59 |

FOREIGN PATENT DOCUMENTS

| | | |
|---|---|---|
| KR | 2001-0064692 A | 7/2001 |
| KR | 10-2004-0059672 A | 7/2004 |
| TW | 511095 | 11/2002 |
| TW | 576941 | 2/2004 |

* cited by examiner

*Primary Examiner* — Lin-Yi Lao
*Assistant Examiner* — Priyank Shah
(74) *Attorney, Agent, or Firm* — Birch, Stewart, Kolasch & Birch, LLP (57) ABSTRACT

A display device includes a rescue circuit line structure having a first conductive pattern, a second conductive pattern and a dielectric layer. The first conductive pattern is adapted to electrically interconnect a first circuit element and a second circuit element, wherein the first conductive pattern has an open. Neither of the first and second conductive patterns is used as a data line or a scan line. The dielectric layer is located on the open and disposed between the first conductive pattern and the second conductive pattern.

6 Claims, 6 Drawing Sheets

RESCUE CIRCUIT LINE, DISPLAY DEVICE HAVING THE SAME AND METHOD FOR MANUFACTURING THE SAME

CROSS-REFERENCE TO RELATED APPLICATIONS

This application is a continuation of U.S. patent application Ser. No. 11/517,347, filed Sep. 8, 2006, now U.S. Pat. No. 7,782,286 which claims the benefit of Taiwan Patent Applications Serial No. 94131221, filed Nov. 9, 2005. The entire contents of all of the above applications are hereby incorporated by reference.

FIELD OF THE INVENTION

The invention relates to a circuit line for a display device and the method thereof, and more particularly to the circuit line structure having a rescue circuit line and the method for manufacturing the rescue circuit line.

BACKGROUND OF THE INVENTION

The circuit line structure on a circuit board or a display device may have a discontinuous circuit pattern due to different design. And a part of the circuit pattern, such as in the rescue line, the signal line, or the data line, is required to be arranged as "open". In case of the pattern of the part having open is not consistent with the pattern on the photo mask which is applied to define circuit pattern by a stepper, it is relatively inconvenient to use the photo mask step by step for defining the circuit pattern.

An active type display device is shown below and includes a base plate and a pixel array mounted on the base plate. The pixel array includes a plurality of scan lines and a plurality of data lines transversely crossing the scan lines to define a plurality of pixel units. A TFT (thin film transistor) serves as a switch for each of the pixel units. The TFT generally includes a source and a drain connected to the respective scan and data lines of the respective pixel unit. When the scan or data line is broken at a point, the signal cannot be fed into the pixel unit located beyond the broken point, thereby causing poor display ability of the pixel unit, thus quality deterioration of a displayed image occurs.

Figure 1:
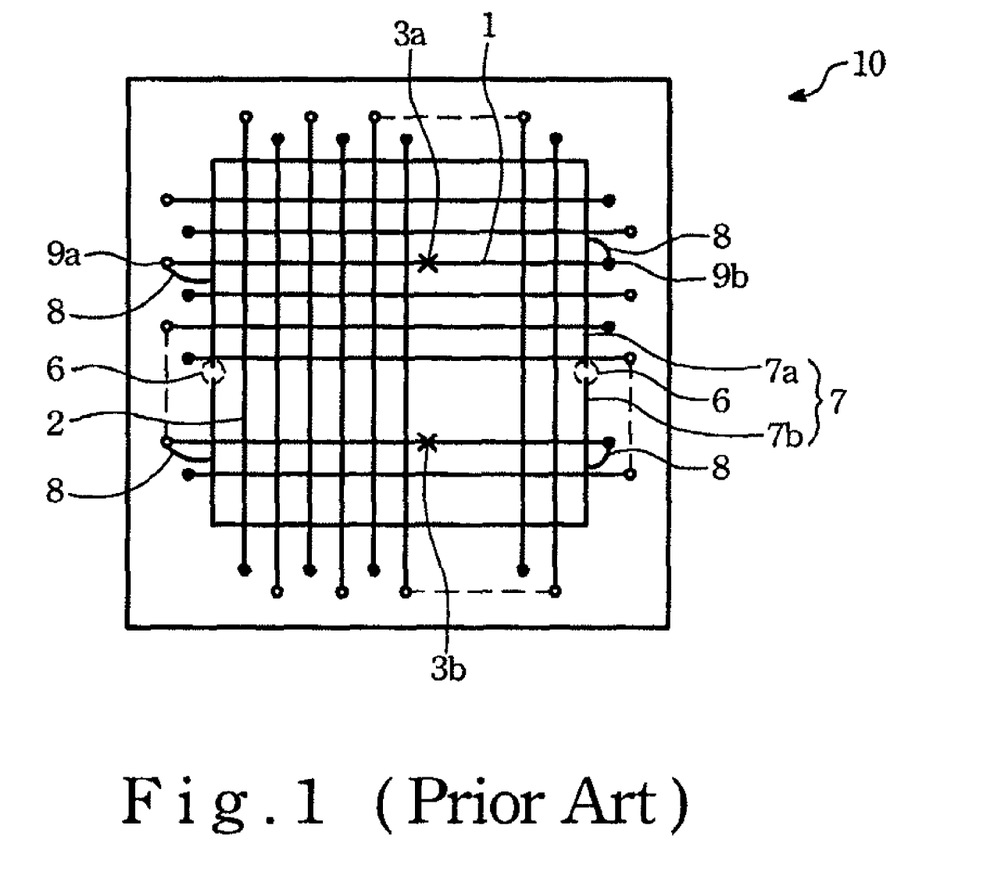
FIG. 1 is a plane view of a rescue circuit line structure in a conventional display device.

FIG. 1 shows a conventional display device 10 which includes a plurality of scan lines 1, a plurality of data lines 2 and a rescue circuit line 7, wherein the data lines 2 vertically and respectively cross the scan lines 1 to define a plurality of pixel units, which form an active area. The rescue circuit line 7 can be divided into a first rescue line portion 7a and a second rescue line portion 7b by the open 6 such that the first rescue line portion 7a surrounds a portion of the active area while the second rescue line portion 7b surrounds the other portion of the active area. As illustrated, the display device 10 has two breaks 3a, 3b. The break 3a is encircled by the first rescue line portion 7a while the break 3b is encircled by the second rescue line portion 7b. Two opposite ends of each break 3a or 3b are connected to the first and second rescue line portions 7a, 7b via the conductive lines 8, respectively, so as to fed signal via the first and second rescue line portions 7a, 7b.

In the normal condition (i.e. there is no break in the scan line 1), the scan line 1 scans the pixel units from the left terminal 9a to the right terminal 9b. When the scan line 1 has the break 3a, the scan line 1 scans only those pixel units located between the left terminal 9a and the break 3a. At such circumstance, the conductive line 8 can be applied to connect the terminals 9a, 9b and the first rescue line portion 7a in order to feed the signal into the pixel unit located between the right terminal 9b and the break 3a.

If the first and second rescue line portions 7a, 7b have to be formed on a large size plate, a photo mask with small dimension is usually applied in the lithography by the stepper in order to enhance the performance.

SUMMARY OF THE INVENTION

It is the object of the present invention to provide a circuit line and the method thereof for swiftly manufacturing the discontinuous circuit lines having an open for optionally forming a route between the breaks in the circuit line or keeping the open circuit in the circuit line.

In one aspect of the present invention, a rescue circuit line structure is provided for a display device. The rescue circuit line structure includes a first conductive pattern adapted to electrically interconnect a first circuit element and a second circuit element; a second conductive pattern; and a dielectric layer disposed between the first conductive pattern and the second conductive pattern, wherein neither of the first and second conductive pattern is used as a data line or a scan line.

In a second aspect of the present invention, a method for fabricating a circuit line structure is provided. The fabricating method includes the steps of: forming a first conductive circuit on a base plate; applying a mask to the first conductive circuit so that the first conductive circuit has a first open; moving the mask for a predetermined distance in a direction; applying the mask to the first conductive circuit so that the first conductive circuit has a second open; forming a dielectric layer on the first conductive circuit so as to cover the open points thereof; and forming a second conductive circuit on the dielectric layer, wherein neither of the first and second conductive circuit is used as a data line or a scan line.

In a third aspect of the present invention, a provided display device includes: a pixel array disposed on a base plate; a driving unit disposed at one side of the pixel array and electrically connected to the pixel array; and a rescue circuit line structure disposed on the base plate, including: a first conductive pattern adapted to electrically interconnect the driving unit and the pixel array; a second conductive pattern; and a dielectric layer disposed between the first conductive pattern and the second conductive pattern, wherein neither of the first and second conductive pattern is used as a data line or a scan line.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENTS

Figure 2:
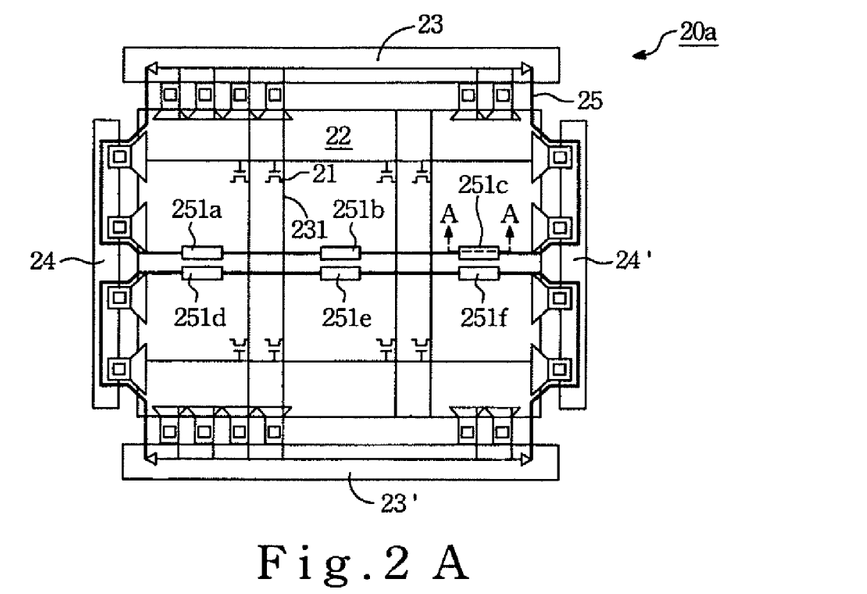
FIG. 2A is a circuit diagram illustrating a rescue circuit line structure in a display device of the present invention.
FIG. 2B is a circuit diagram illustrating another rescue circuit line structure in the a display device of the present invention.

FIG. 2A shows a circuit line structure 20a of a display device of the present invention. The circuit line structure 20a includes a plurality of TFTs (Thin Film Transistors) 21 disposed in an active area 22, at least one data driving unit 23, 23' and at least one scan driving unit 24, 24' which are disposed at the periphery of the active area 22 and electrically coupled to the TFTs 21. A rescue circuit line 25 surrounds the periphery of the active area 22, and is coupled to the data driving unit 23,23' and the scan driving unit 24, 24'. The rescue circuit line 25 further extends into the active area 22.

When there is no failure or break in circuit line structure 20a, the rescue circuit line 25 between the data driving units 23, 23' and the TFTs 21 or between the scan driving units 24, 24' and the TFTs 21 is kept at the broken circuit state. In this embodiment, two rescue circuit lines 25 are employed such that each surrounds one half (upper or lower portion) of the active area 22, and has a plurality of open circuit portions 251a-251f. Each open circuit portion 251a-251f extends into the active area 22 and spans across a plurality of the data lines 231. The active area 22 can be divided into several rescue regions depending on the locations of the open circuit portions 251a-251f so that one open circuit portion located at a respective rescue region provides a specific repair and rescue effect. Note that a melting process is conducted on the open circuit portions 251a-251f in order to establish electrical connection. For instant, the open circuit portions 251a and 251c can be optionally selected and are arranged to be electrically connected while the open circuit portion 251b can be arranged to remain in a situation that the rescue circuit line 25 surrounding the upper section of the active area 22 can be divided into left and right line portions for repairing the circuits in the left and right sides of the upper section of the active area 22.

FIG. 2B shows another type circuit line structure 20b of the display device of the present invention. When manufacturing a display device with an extremely large display panel, each of the data lines 231 shown in FIG. 2A can be designed as two vertically spaced apart data lines 231a, 231b. In this condition, when the display panel is viewed from topside, the rescue circuit line 25 transversely crosses the data lines 231a, 231b. In fact, the rescue circuit line 25 is spaced apart and disconnected from the data lines 231a, 231b by a dielectric layer in cross-section of the display panel. In FIG. 2A, each of the open circuit portions 251a-251f is preferably disposed between two adjacent data lines 231. In FIG. 2B, the open circuit section 251b is disposed between the adjacent data lines 231a and 231c. The formation of the circuit portions 251a-251f on a base plate will be described in the following paragraphs.

Figure 3:
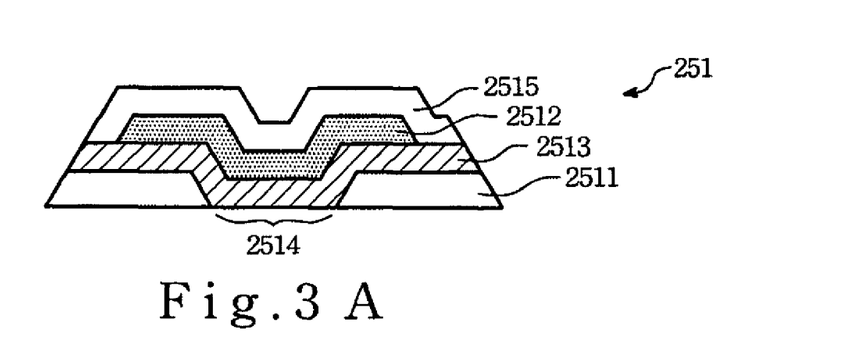
FIG. 3A is a cross-section view taken along line A-A in the rescue circuit line structure of FIG. 2.
FIG. 3B is a top view illustrating an broken circuit state in the rescue circuit line structure of FIG. 3A.
FIG. 3C is a top view illustrating a closed circuit state in the rescue circuit line structure of FIG. 3A.

FIG. 3A is a cross-section view taken along line A-A' of the circuit portion 251c of FIGS. 2A and 2B. The open circuit portion 251c includes a first conductive pattern 2511, a second conductive pattern 2512, and a dielectric layer 2513 disposed between the first and second conductive patterns 2511, 2512 to prevent signal transmission between the first and second conductive patterns 2511, 2512. The first conductive pattern 2511 disposed on the base plate is formed of metal. The first conductive pattern 2511 is formed with an open 2514, and is further connected electrically to the TFT (a first circuit element) and the driving unit (a second circuit element). The dielectric layer 2513 is disposed above the first conductive pattern 2511 and thus overlaps the open 2514. The second conductive pattern 2512 is formed of metal and disposed above the dielectric layer 2513. A protection layer 2515 is generally disposed above the second conductive pattern 2512.

Please refer to FIG. 3B, the top view of the open circuit portion 251c is illustrated when the circuit line structure is operated without failure and there is no need to use the rescue circuit line 25. The first conductive pattern 2511 has left and right pattern strips for coupling purposes. The dielectric layer 2513 and the second conductive pattern 2512 span across the open 2514 in the first conductive pattern 2511.

Referring to FIG. 3C, when the circuit line is broken and it is desired to employ the rescue circuit line 25 for establishing electrical connection between the first and second conductive patterns. A melting process can be conducted by means of a laser instrument (not shown) to melt through the dielectric layer 2513 for providing the electrical connection between the first and second conductive patterns 2511, 2512. It means that when the melting process is performed, the dielectric layer 2513 will be melted to form a hole therethrough and a portion of the second conductive pattern 2512 right above the hole will also be melted and is to flow into the hole to form a contact which provides the electrical interconnection between the first and second conductive patterns 2511, 2512, and to conduct electricity through the open circuit section 251c (or between adjacent circuit elements).

The first conductive pattern 2511 further has a plurality of contact points for coupling electrically to the TFT 21 and the data driving units 23, 23' or the scan driving units 24, 24'. The number of the data driving unit or the scan driving unit may be one or more than one. The first conductive pattern 2511 can be designed as discontinuous patterns or the pattern strip is formed with the open 2514 to prevent the electrical communication between the TFT 21 and the scan driving units 24, 24' or between the TFT 21 and the data driving units 23, 23'. The first and second conductive patterns 2511, 2512 can be made from two different metals or same metal. For instant, a metal having a low resistance can be selected to form the first conductive pattern 2511 while another metal liable to rapid melting can be chosen for the second conductive pattern 2512. A dielectric material, such as silicon nitride, is deposited on the first conductive pattern 2511 in order to form the dielectric layer 2513.

Figure 4A:
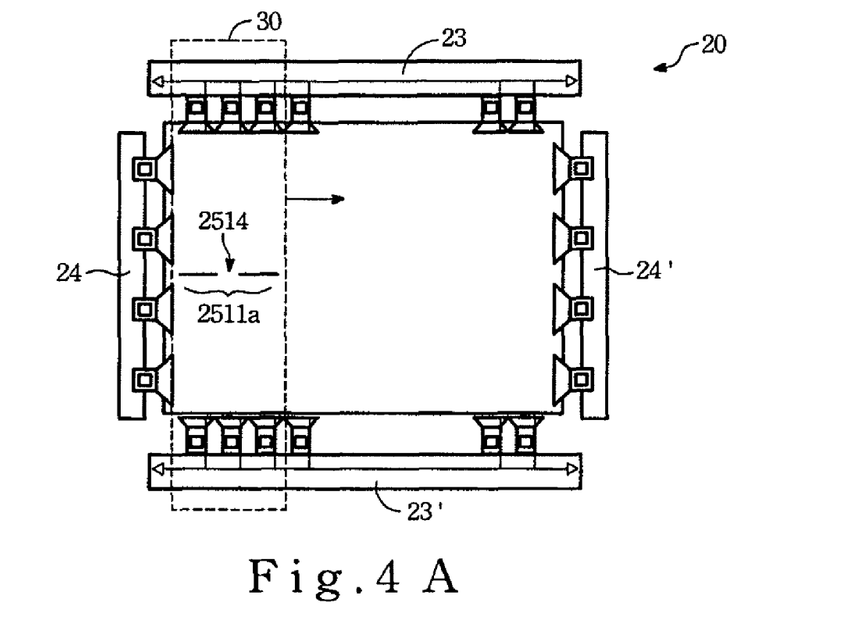
FIGS. 4A to 4D show the steps of a method for fabricating a rescue circuit line structure according to the present invention.
Figure 4B:
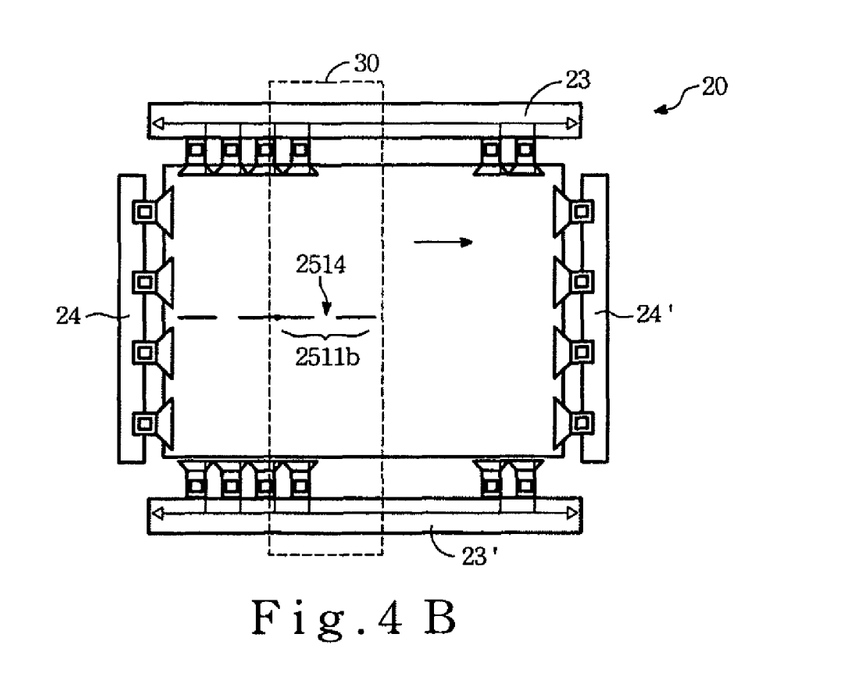

Conventionally, as shown in FIG. 1, supposing the circuit pattern on the photo mask is continuous, there is no open 6 can be defined by the photo mask. Therefore, several opens 6 will be defined along the circuit pattern thereafter. In addition, portions of the circuit pattern around the opens are non-symmetric relative to one another. In such a case, a specific photo mask having the circuit pattern compatible to the non-symmetric circuit portions is required to be constructed, thereby causing inconvenience to the manufacturers. FIGS. 4A to 4D show the steps in a method for fabricating a rescue circuit line structure according to the present invention. The first conductive pattern 2511 is hereby named as a first conductive circuit. The dielectric layer 2513 is named as the dielectric pattern while the second conductive pattern 2512 is named as a conductive pattern. Firstly, an open circuit line is designed on a first photo mask 30. As shown in FIG. 4A, first, forming a first conductive circuit on the base plate, then the first photo mask 30 is applied on the first conductive circuit to define a first conductive circuit pattern 2511*a* with an open 2514 on the base plate. Referring to FIG. 4B, the first photo mask 30 is moved for a predetermined distance along a longitudinal direction (shown by arrow in the drawing) of the base plate and applied again on the first conductive circuit so as to define a second conductive circuit pattern 2511*b* with an open 2514 on the base plate. The first and second conductive circuit patterns 2511*a*, 2511*b* are made from the same metal, and have the same structure, except in their locations. The number of conductive portions is not limited. The first photo mask 30 can be moved for another predetermined distance in the direction and the mask is applied to the first conductive circuit so as to define a third conductive circuit pattern with an open.

By adjusting the moving range (the predetermined distance) of the first photo mask 30 on the base plate, the second conductive circuit pattern 2511*b* may optionally form to contact with or disconnect from one end of the first conductive circuit pattern 2511*a*. When the moving distance of the first photo mask 30 is equal to or smaller than the longitudinal length of the first conductive circuit pattern 2511*a*, the adjacent ends of the first and second conductive circuit patterns 2511*a*, 2511*b* can be integrally formed. When the moving distance is greater than the longitudinal length of the first conductive circuit pattern 2511*a*, the adjacent ends of the first and second conductive circuit patterns 2511*a*, 2511*b* are disconnected from each other.

Figure 4C:
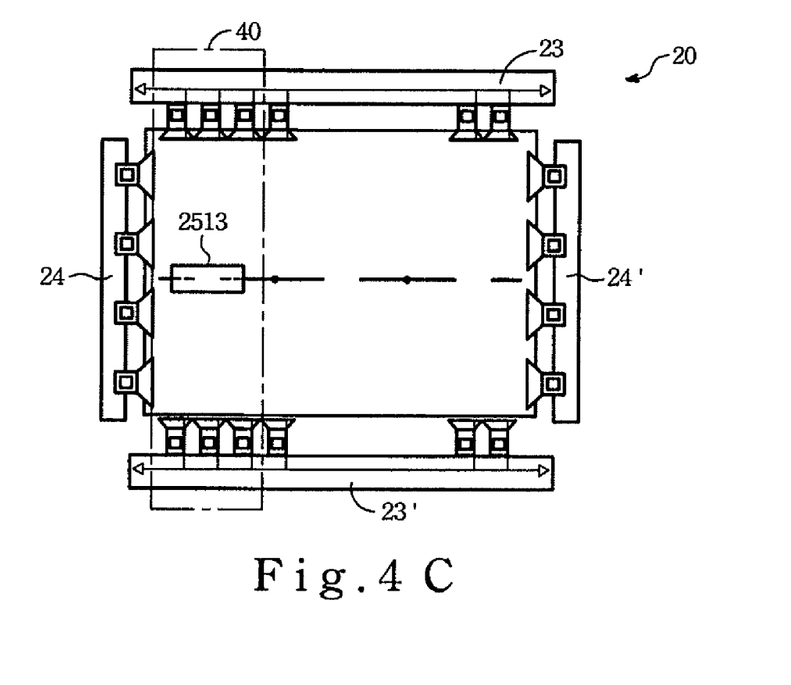
Figure 4D:
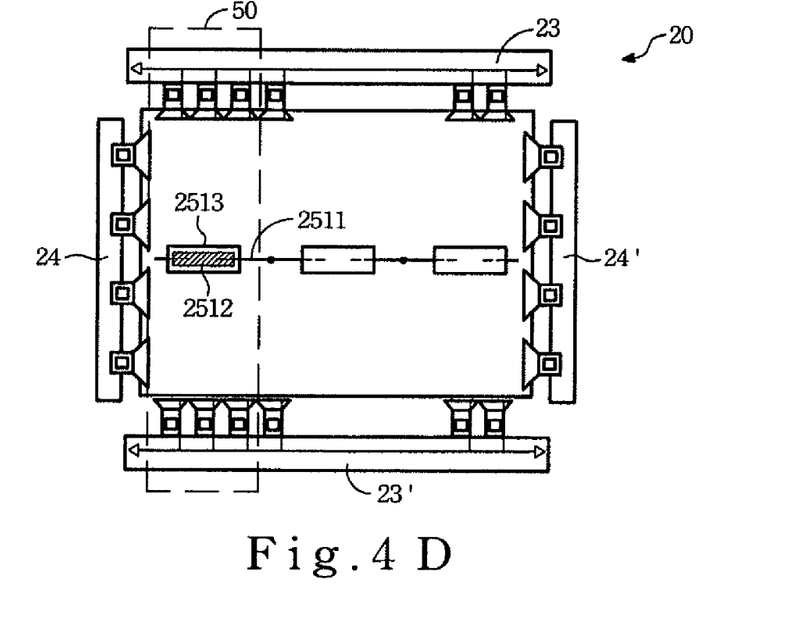

Referring to FIG. 4C, first, applying a dielectric layer on the first conductive circuit so as to cover the opens 2514, then a block diagram is designed on a second photo mask 40 which is applied on the dielectric layer to define the dielectric pattern 2513 such that the dielectric pattern 2513 overlaps the open 2514 of the first or/and second conductive circuit pattern 2511*a*, 2511*b*. As shown in FIG. 4D, the conductive pattern 2512 is defined by means of a third photo mask 50 which has another one block diagram designed thereon such that the conductive pattern 2512 is disposed above the dielectric pattern 2513, thereby completing the formation of the open circuit portion 251*c*.

Figure 5:
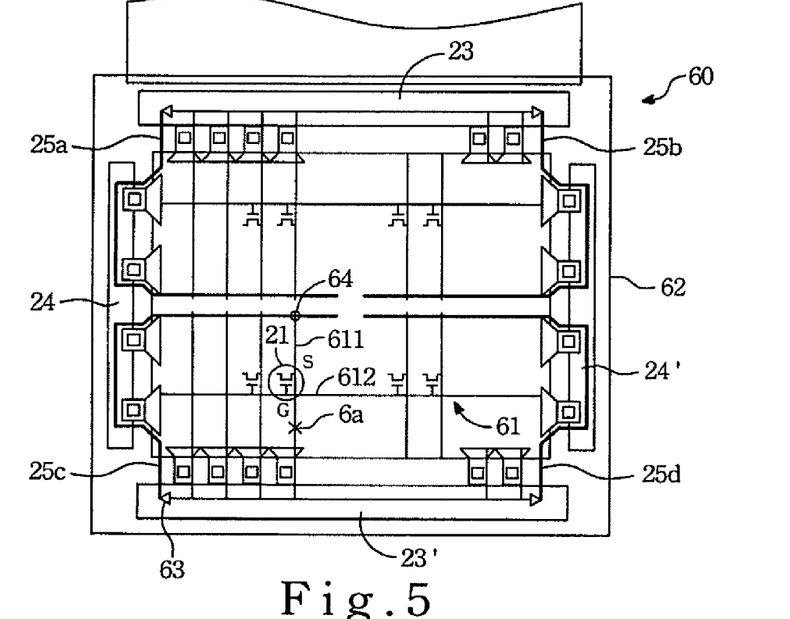
FIG. 5 shows a display device equipped with the rescue circuit line structure of the present invention.

Referring to FIG. 5, a display device 60 of the present invention is shown. The display device 60 includes a pixel array 61, a data driving units 23, 23', a scan driving units 24,24', a data line 611, a scan line 612, and four rescue circuit lines 25*a*-25*d*. The pixel array 61 is disposed on a base plate 62. The data driving units 23, 23' and the scan driving units 24, 24' are disposed at two sides of the pixel array 61, and are further coupled to the pixel array 61 via the data line 611 and the scan line 612, respectively. Each rescue circuit line 25*a*-25*d* is looped around the pixel array 61, and includes the aforementioned open circuit portion 251. As shown in FIGS. 2, 3A, 3B and 3C, the conductive circuit pattern 2511 may span across a display region or is disposed out the display region.

FIG. 2B illustrates a state of the display device 60 prior to the circuit repairing. Each of the rescue circuit line 25*a*-25*d* spans across more than one of the data lines 611. When there is a break (6*a*) in the data lines 611 at the lower section of the display device 60 (see FIG. 5), a melting process can be conducted on the open circuit portion 251*d* so as to result in the electrical connection between the spaced apart conductive circuits. However, the conductive circuits in the open circuit portion 251*e* remains in a disconnected state. In this condition, it is preferable to choose the rescue circuit line 25*c* in FIG. 5 for repairing the break 6*a* in the data line 611 for signal transmission. Since the rescue circuit line 25*c* overlaps the data line 611, the melting process conducted on the overlapping portions 64 can result in smooth transmission of the source signal to the break (6*a*). After the melting process, because the rescue circuit line 25*c* is conducted through the contact in the dielectric pattern 2513, the resistance therebetween is greater than that of the normal circuits. Thus, the conductive circuit pattern 2511 must be coupled to an amplified circuit 63 to permit the signal from the data driving unit 23' being amplified first and then transmitted to the TFT 21.

As illustrated in FIG. 5, the rescue circuit lines 25*a*, 25*b*, 25*c* and 25*d* are introduced between the data driving units 23,23' and the TFT 21 so that after conducting the melting process over the overlapping portions 64, the data driving unit 23' is electrically coupled to the source S of the TFT 21 via the rescue circuit line 25*c*.

Figure 6:
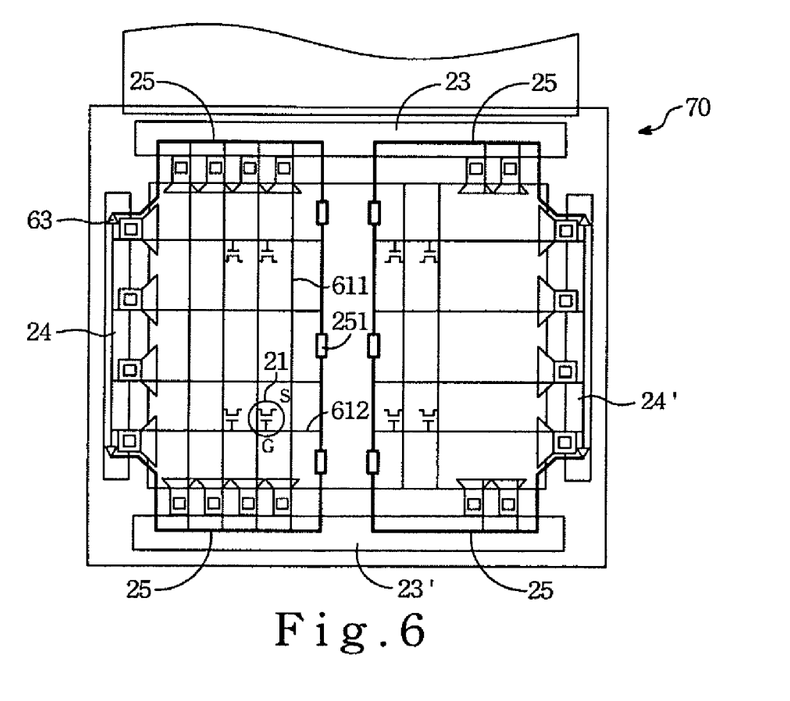
FIG. 6 shows a display device equipped with another type rescue circuit line structure of the present invention.

FIG. 6 illustrates another display device 70 of the present invention, in which, the rescue circuit line 25 can be utilized to repair the scan line 612. The rescue circuit line 25 (or a conductive line) has a first end coupled electrically to the amplified circuit 63 and the data driving units 24, 24' and a second end extending into the active area and span across more than one scan line 612. As stated in the above paragraphs, an appropriate open circuit portion 251 can be optionally selected for the melting process so as to repair the break in the scan line 612. Note that each open circuit portion 251 is preferably arranged between two adjacent scan lines 612. When compared to the prior art technology, the rescue circuit line structure of the present invention can be swiftly manufactured such that the rescue circuit line structure may include a plurality of open circuit portions at predetermined locations. With these open circuit portions, some circuits can be optionally arranged to maintain electrical connection or electrically disconnection, thereby providing a flexible use of the rescue circuit line structure.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display device comprising:
   a pixel array disposed on a base plate;
   a driving unit disposed at one side of the pixel array and electrically connected to the pixel array; and
   a rescue circuit line structure disposed on the base plate, including:
   a first conductive pattern adapted to electrically interconnect the driving unit and the pixel array, wherein the first conductive pattern has an open;
   a second conductive pattern, wherein neither of the first and second conductive pattern is used as a data line or a scan line; and
   a dielectric layer located on the open and disposed between the first conductive pattern and the second conductive pattern,
   wherein the pixel array has a first portion and a second portion, and the rescue circuit line structure is substantially looped around the first portion of the pixel array.

2. The display device according to claim 1, further comprising an amplified circuit disposed between the rescue circuit line structure and the driving unit.

3. The display device according to claim 1, wherein the open is located between the driving unit and the pixel array.

4. The display device according to claim 1, wherein the driving unit comprises a scan driving unit, the display device further comprises a plurality of scan lines electrically connected to the scan driving unit, and the rescue circuit line structure spans across at least one of the scan lines.

5. The display device according to claim 4, wherein the driving unit comprises a data driving unit, the display device further comprises a plurality of data lines electrically connected to the data driving unit, and the rescue circuit line structure spans across at least one of the data lines.

6. The display device according to claim 1, wherein the driving unit comprises a data driving unit, the display device further comprises a plurality of data lines electrically connected to the data driving unit, and the rescue circuit line structure spans across at least one of the data lines.

* * * * *